(No Model.)  2 Sheets—Sheet 1.

T. W. GREENE.
HORSE HAY RAKE.

No. 259,003.  Patented June 6, 1882.

Witnesses:
O. A. Jenison
H. L. Thayer

Inventor.
Thomas W. Greene.
per O. N. Fuller
Attorney (No Model.) 2 Sheets—Sheet 2.

T. W. GREENE.
HORSE HAY RAKE.

No. 259,003. Patented June 6, 1882.

Witnesses
W. Irving Latimer
H. R. Pratt

Inventor
Thomas W. Greene
per O. N. Fuller
Att'y

UNITED STATES PATENT OFFICE.

THOMAS W. GREENE, OF LANSING, MICHIGAN.

HORSE HAY-RAKE.

SPECIFICATION forming part of Letters Patent No. 259,003, dated June 6, 1882.

Application filed October 17, 1881. (No model.)

*To all whom it may concern:*

Be it known that I, THOMAS W. GREENE, a citizen of the United States, residing at Lansing, in the county of Ingham and State of Michigan, have invented a new and useful Improvement in Revolving Wheel Rakes, of which the following is a specification.

My invention relates to horse hay-rakes of that class in which the rake and its attachments are placed forward of the wheels and in full view of the driver; and the novelty consists in the construction and arrangement of parts, as will be more fully hereinafter set forth, and be specifically pointed out in the claim.

The objects of the invention are to provide ready, simple, and efficient means for raising the rake from the ground bodily in turning, or for transporting it from one field to another, and to lock it in such raised position, and to so construct the raising means that they may be readily and instantly disengaged at will.

The invention is fully illustrated in the accompanying drawings, which form a part of this specification, and in which—

Figure 1:
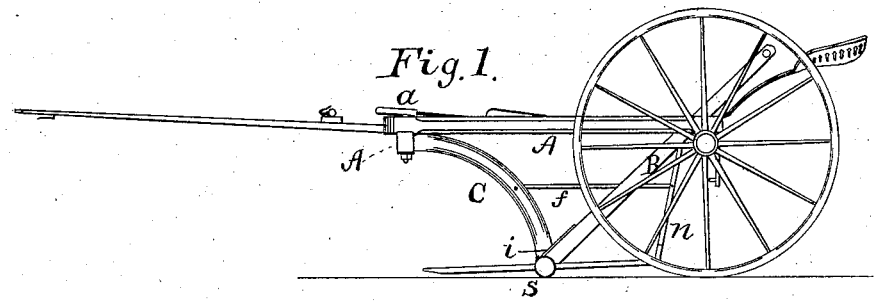
Figure 2:
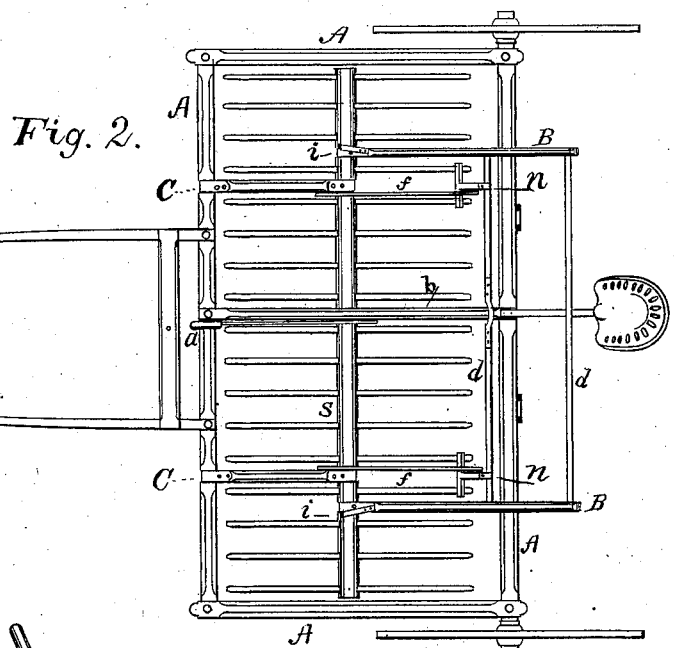
Figure 3:
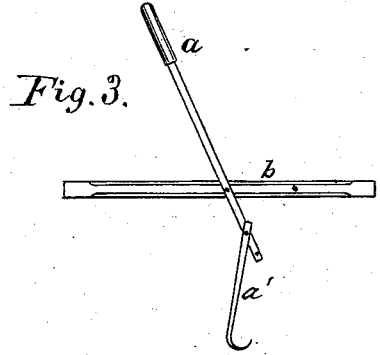
Figure 4:
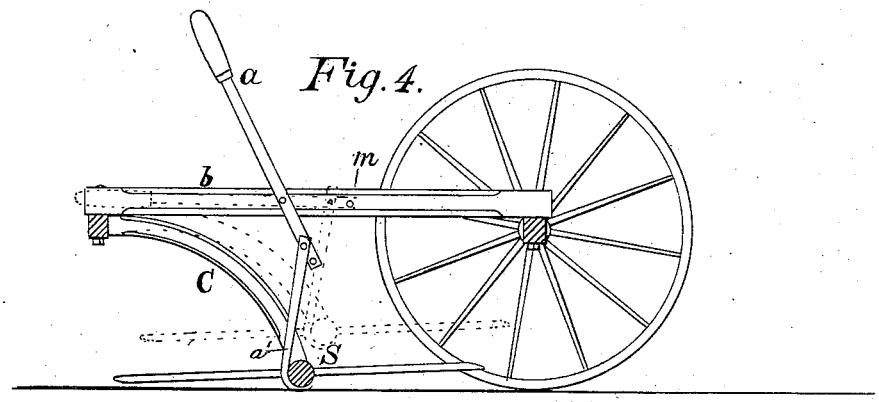
Figure 6:
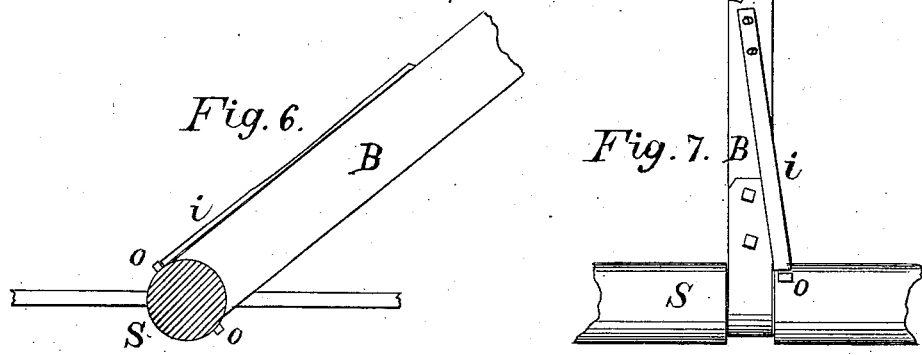
Figure 7:
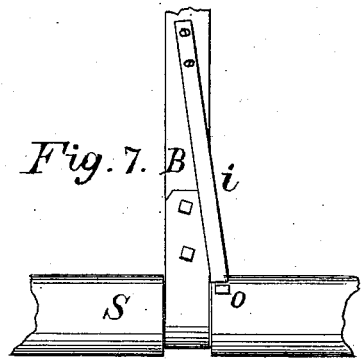

Figure 1 is a side elevation; Fig. 2, a top plan view; Fig. 3, a detail of the raising-lever, &c.; Fig. 4, a vertical section; and Figs. 5, 6, and 7 are detail views.

Referring to the drawings, A represents the main frame, mounted upon ordinary riding-wheels, to the front cross-bar of which is loosely secured by proper straps the curved draw-bars C, to which in turn is similarly secured the rake-head S, as shown. To the rake-head are also strapped the bars B, which, in connection with the cross-bar $d$, form a rectangular frame within easy reach of the driver. Secured to the bars B are spring-dogs $i$, which serve, in relation to the lugs $o$ upon the rake-head, as a means to trip the rake as the frame B $d$ is raised. Dependent from the bars B are stops $n$, which serve, when in operative position, to prevent the rake from tripping, and a rod, $f$, connects each stop rod or standard with the curved draw-bar C. From this construction it will be observed that as the bar $d$ is raised not only do the spring-dogs $i$ act upon the lugs $o$ to turn the rake, but that the elevation of the bars B through the rods $f$ serves to throw the stops $n$ out of operation. The duplication of the bars B, arranged equidistant from the center, and the duplicate stops $n$ allow such an equal force exerted upon the rake-head as prevents any wrenching of the same in its bearings.

The curved draw-bars C, pivoted to the front cross-bar of the frame A, allow the rake to be raised bodily to pass obstructions, or for other desired purpose, and this raising of the said rake is effected by a novel device which I will now explain.

Figure 5:
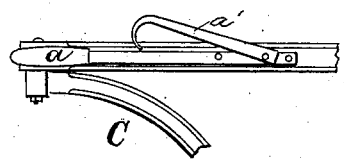

Pivoted to the portion $b$ of the frame A is a hand-lever, $a$, to which is pivoted a hook, $a'$, the said hook being adapted to be readily thrown in operation to raise the rake, as seen in dotted lines, Fig. 4, and the lever $a$ locked by a pin, $m$, to the bar $b$, or to be thrown out of operation and out of the way, as seen in Fig. 5.

The location, arrangement, and construction of the hook $a'$, lever $a$, and the pin $m$ to lock through the hole in the end of the lever $a$ are deemed to be the important features of this invention, in their relation to the bar $b$, pivoted draw-bar C, and rake-head.

From this description the operation of the device is obvious.

What I claim as new is—

The combination, with the rake-head S, pivoted draw-bars C, and the bar $b$ of the main frame, of the hook $a'$, pivoted to the lever $a$, the lever $a$, pivoted to the bar $b$, and the fixed pin $m$, adapted to lock the lever $a$ to the bar $b$ when the rake is elevated, the whole being arranged and adapted to serve substantially as and for the purposes set forth.

THOMAS W. GREENE.

Witnesses:
H. L. THAYER,
E. LONGYEAR.